Feb. 8, 1966        B. J. YELIN         3,233,561
                    FREIGHT VEHICLE
Filed Jan. 14, 1963                 3 Sheets-Sheet 1
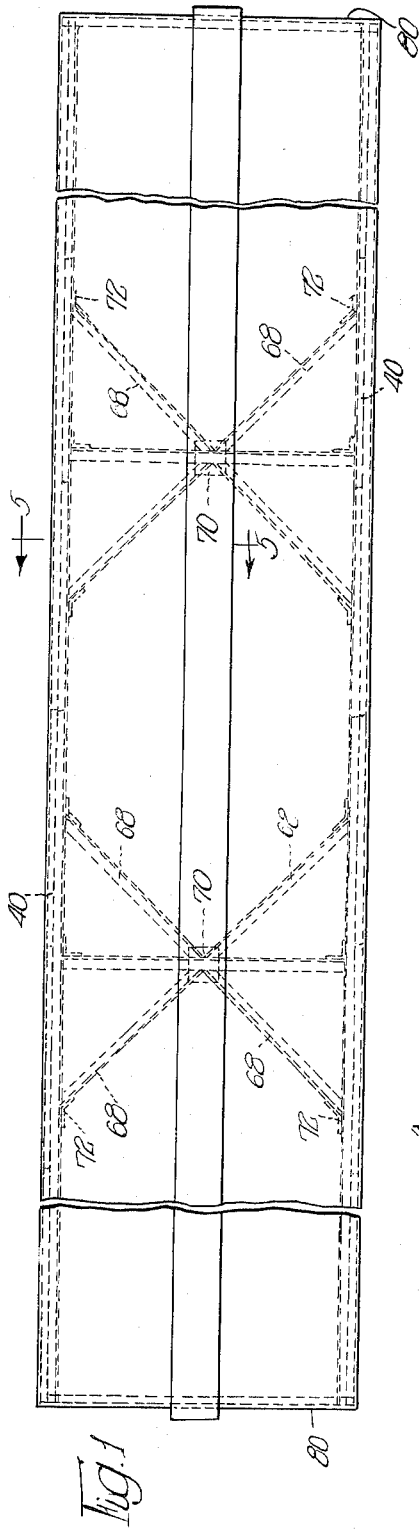
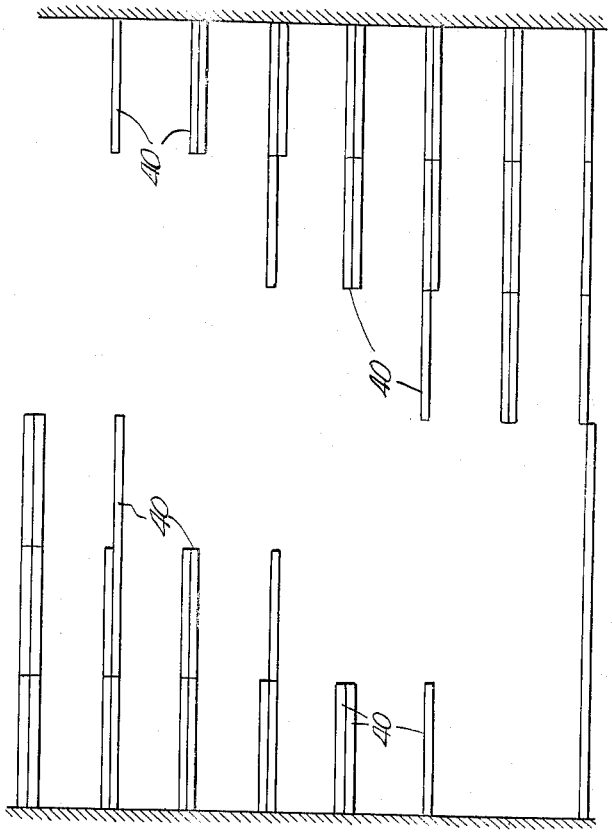
INVENTOR
Bernard J Yelin,
BY Sabin C. Bronson
         Atty Feb. 8, 1966  B. J. YELIN  3,233,561
FREIGHT VEHICLE
Filed Jan. 14, 1963  3 Sheets-Sheet 2
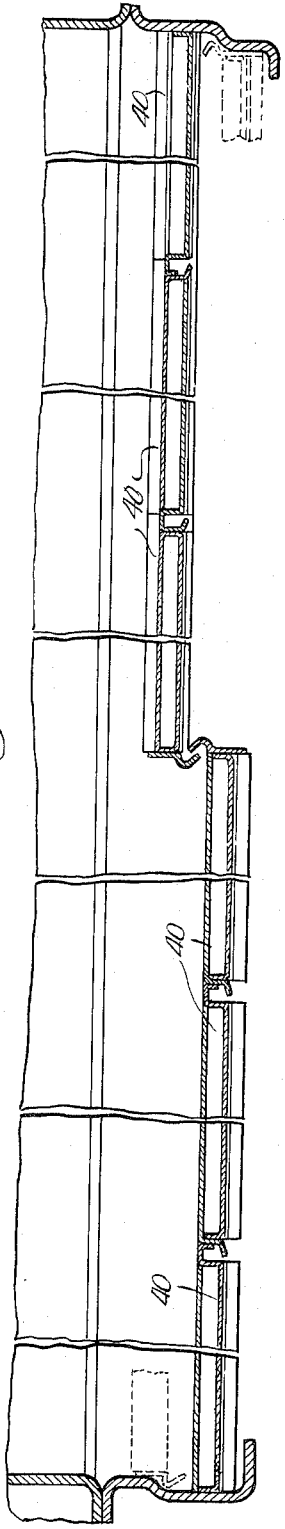
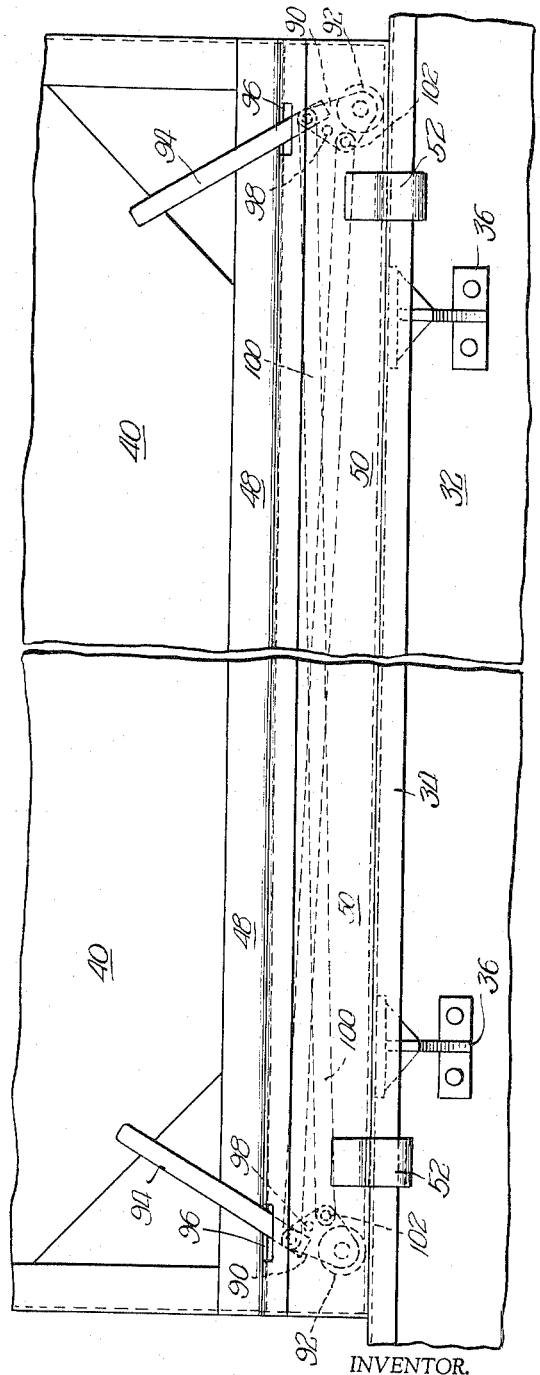
INVENTOR.
Bernard J. Yelin,
BY

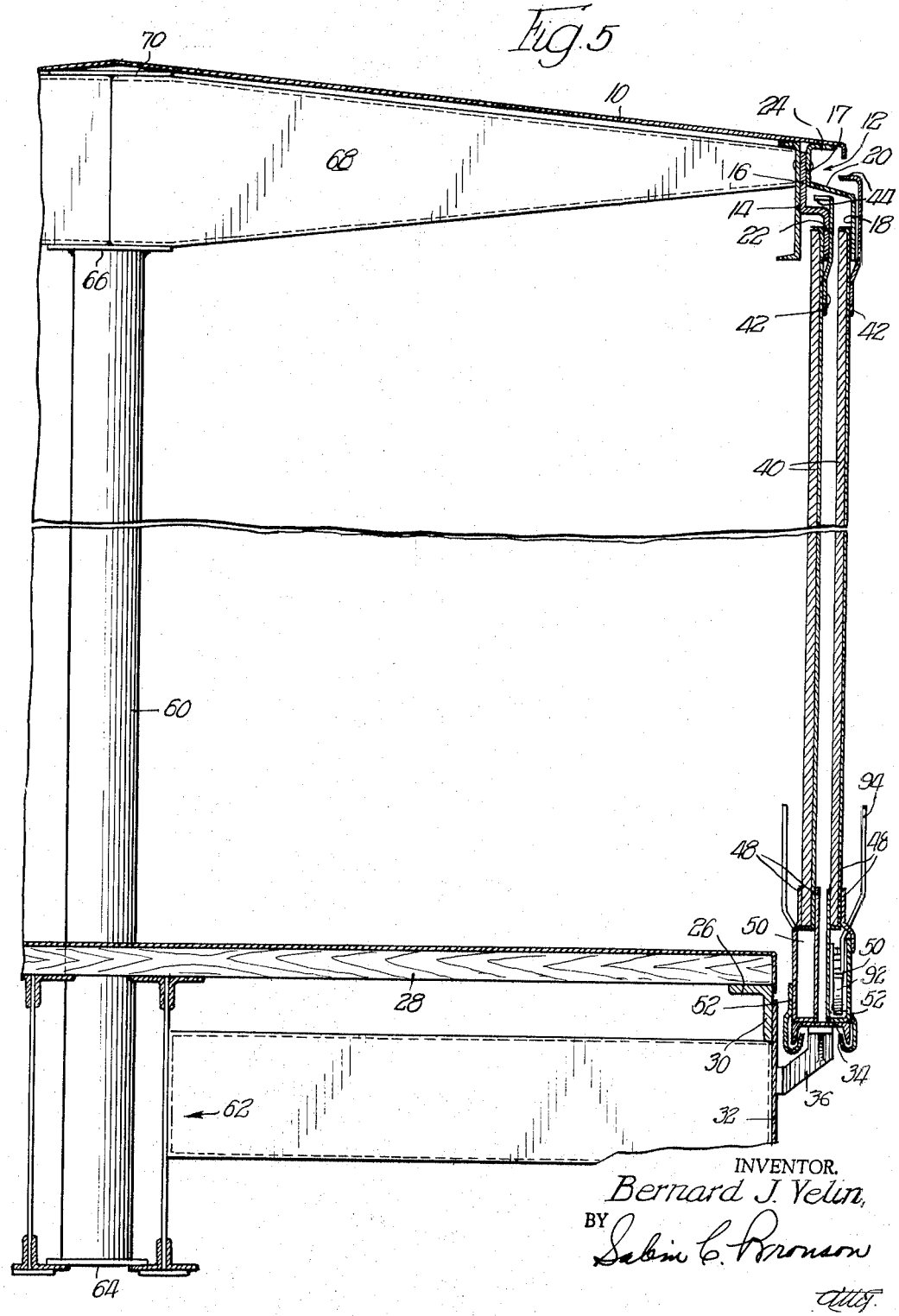

United States Patent Office 3,233,561
Patented Feb. 8, 1966

3,233,561
FREIGHT VEHICLE
Bernard J. Yelin, Buffalo, N.Y., assignor to Stanray Corporation, Chicago, Ill., and Morrison-International Corp., Buffalo, N.Y., both corporations of Delaware
Filed Jan. 14, 1963, Ser. No. 251,350
6 Claims. (Cl. 105—355)

This invention relates to railway freight cars, sides and doors therefor, and means for supporting the roof on such cars, the car sides and doors being constructed so that at least any one-half of the length of the car side may be opened to facilitate the loading of long lading laterally into the car through the opened area of the car side, by mechanical means, if desired.

It is the purpose of the invention to provide a car having side walls constructed of a plurality of doors that are longitudinally slidable parallel to the side of the car in at least a pair of parallel tracks, with not more than half of the doors being slidable in one track and the remainder of the doors being slidable in the other track(s), so that the doors on one track may be moved into juxtaposition with the other doors, thereby leaving one-half or more of the car side open.

The car shown in the accompanying drawings and herein described discloses sides each comprised of six such slidable doors, three being mounted to slide in each of two tracks. It is obvious, however, that, depending upon the length of the car, a more or less number of doors could be used to accomplish the purpose of the invention. It is also obvious, that, with the multiplicity of tracks, and the distribution of more or less doors on each of the tracks, a greater portion of the car side may be rendered open. It is furthermore apparent that, since all doors are slidable, any of many arrangements of the doors may be resorted to to open a particular area of the car side.

The roof and ends of applicant's car conform to standard house car construction so that with the side and door arrangement the lading is protected from the elements, the side wall doors being equipped with locking devices to maintain them in weathertight relation as well as to provide a means of securing the lading against tampering or pilfering.

It is another object of the invention to support the longitudinal expanse of the car roof by one or more columns, located in the longitudinal center of the car, the lower end of each column passing through the car decking and into the center sill, and the lower portion of the columns being securely braced in all direction so as to maintain the columns in rigid upright condition. Attached to and made a part of the upper portion of each column is an arrangement of cantilevered sections which extend to the side plates to reinforce and support them to maintain elevational clearances and support a system of tracks on which the longitudinally movable side doors will operate.

Further advantages and objects of the invention will become apparent to those skilled in the art from the teaching of the following description of the invention.

Referring now to the accompanying drawing forming part of this application and wherein like reference characters indicate like parts:

FIG. 1 is a top plan view, partly broken away, of a railway house car embodying the invention.

FIG. 2 is a composite diagrammatic view illustrating various possible arrangements of doors in part comprising the invention.

FIG. 3 is a longitudinal sectional view through one side of the car showing a possible relationship of one-half of the doors to the other half of the doors.

FIG. 4 is a side elevation of the lower part of a door showing the means of raising the door on rollers so that it may be rolled along the track on which it is mounted when desired.

FIG. 5 is a cross sectional view on the line 5—5 of FIGURE 1.

A preferred embodiment of the invention is shown in the accompanying drawings wherein conventional parts of the car shown include the roof 10, and ZU side plate 12. A Z-shaped side plate reinforcement is provided, it having an inner vertical flange 16 abutting flatwise against a similar flange 17 of the side plate. Also a channel member 14 is provided, the web of which abuts flatwise against the vertical flange 16 of the side plate reinforcement, and the flanges 17, 16 and the channel 14 are riveted together as shown in FIGURE 5. The side plate has an outer flange 18, which is connected to the vertical flange 17 by a web 20. The side plate reinforcement likewise has an outer vertical flange 22 parallel to and spaced inwardly from flange 16, the purpose of which will be hereinafter explained. The side plates, the side plate reinforcements, and the channels 14 extend from end to end of the car on both sides and at their ends are secured to the upper ends of the corner posts of the car as is common. Also the roof 10 is supported at its longitudinal side edges by overlapping the outwardly turned flange 24 that issues from the upper edge of the flange 17 of the side plate.

The side sill of the car is an angle bar that extends the length of the car from corner post to corner post, one on each side thereof. The side sill is positioned with one flange 26 disposed horizontally in the plane of the under surface of the floor 28 of the car, supporting the longitudinal side edges of the floor. The other flange 30 of the angle side sill is vertically disposed and in the plane of the longitudinal side edge of the car floor 28. A side sill reinforcing plate 32, of the fish-belly type, is secured along its upper margin to flange 30 of the side sill. To this reinforcing plate the downwardly facing channel track 34 is supported by suitable brackets 36 as clearly shown in FIGURE 5. The width of the channel track 34 is substantially the same as the overall width of the side plate and its reinforcement, and this width is sufficient to accommodate the side doors in overlapping relation thereupon.

The side doors are shown at 40, there being, in the modification of the invention shown, six of them for each side of the car. These doors are rectangular panels and extend between the side plate and the side sill. Near the upper outer corners of each door are secured guide clips 42 which are offset sufficiently to allow the flanges 22 and 18 to project down between the upper margin of the doors and said clips and thereby hold the doors in proper position while sliding along the side of the car. The upper margins of the clips are turned inwardly as at 44—44 to overlap the webs of the side plate and side plate reinforcement as shown in FIG. 5.

Along the lower margin, each door is provided with a hollow housing 50 that has spaced upwardly extending flanges 48 overlapping and secured to the lower margin of the door. Adjacent the ends of these housings there are provided guide clips 52—52, the lower longitudinal margins of which are offset and turned under the flanges of the channel track 34 in hook-like fashion so as to guide the door as it rolls along the track.

To support the roof and side plate structure of the car there are provided one or more, and in this instance two, tubular columns shown at 60, each of which comprises a standard metal pipe. These columns are placed in the longitudinal center of the car, one on either side of the transverse center thereof, and each extends through the floor 28, through the center sill 62, which comprises two spaced fabricated I-beams, and secured to a tie plate 64, spanning and secured to the facing lower flanges of the I-beams. The center sill is also of the fish-belly type. The columns extend upwardly to adjacent the roof of the car at the ridge thereof, and the upper end of each column has a support plate 66 extending across the top thereof and secured thereto which support the inner ends of the radially disposed roof supporting beams 68. These beams 68 are of the I-beam type, prefabricated, and made with a relatively wide end which rests on the support plate 66, and a much narrower end which is attached to the side plate reinforcing channel 14 of the car. These umbrella-like structures together with the car ends and side plate structure form the entire support for the roof 10 of the car. A rectangular tie plate 70, similar to the support plate 66, overlaps the ends of the beams 68 and is secured thereto to form a tension member between the beams. As seen in FIG. 1, there are four of these beams radiating from each post and at their outer ends they are attached to the side plate channel reinforcement 14 by, for example, angle clips indicated at 72. The beams are wider at their ridge ends than at their eaves ends of the car, the upper and lower edges tapering uniformly from the center of the car to the eaves in the form of a truncated isosceles triangle, the taper being the same as that of the roof. These beams extend across the car at 45° angles, and another pair 74 crosses the car at right angles thereto, all radiating from a column 60 and meeting over a support plate 66.

The side plate and reinforcing structure form a strong eaves area of the car, which is quite necessary since there are no side posts whatever along the sides of the car.

The ends of the car, shown at 80, are conventional, rising from the end sill of the car underframe between and secured to the corner posts of the car. Thus the car ends, the unusually strong side plate and reinforcing structure just described, supported by the columns 60 and radiating beams, provide adequate support for the roof 10 of the car.

As before stated, each car door is provided with a hollow housing 50 along its lower edge. Within this housing, at each end thereof is provided a triangular frame 90 (FIG. 4) which rollably supports a roller 92 in one corner thereof. A manipulating handle 94 extends through a slot 96 in the housing 50 and the end of the handle is pivoted to the frame 90 at another corner of the frame 90. The triangular frame is pivoted to the housing 50 as at 98, adjacent to the handle. The pivotal point of each handle to its triangle is also pivotally connected by a tie bar 100 to the third corner 102 of the opposite triangle. Thus when the operating end of a handle 94 which projects through an opening 96 is rotated, for example, clockwise, it will cause the wheels 92 to be forced down against the track 34 raising the door thereon so that it may then be rolled on said rollers to any location along the track.

As seen in FIG. 5, the upper margins of the doors 40 in the outer half of track 34 extend into the space between flange 18 of the side plate and flange 22 of the side plate reinforcement and move therein longitudinally of the car. The vertical edges of the doors are provided with the usual sealing strips as indicated in FIGURE 3, this being common in the art.

It will be apparent to those versed in the art that the illustration and description are of one modification of my invention, and that various deviations therefrom may be made without departing from the spirit and scope of the appended claims. For instance, the modification shown and described, comprises two tracks for the side doors, whereas, depending upon the length of car, and width of doors, more tracks may be utilized, thus making it possible for more area of a car side to be opened.

It will also be apparent to those versed in the art from the teaching of the invention how long bundles of lumber, for example, may be loaded or unloaded into or from the car. The required number of doors are opened to permit the length of bundle to be raised by a lift truck and then maneuvered through the door opening and onto the dock, or from the loading dock into the car.

I claim:

1. A freight car comprising in combination an underframe including side sills, end sills, a floor on said underframe, and center sill, end walls at each end of the car extending vertically above the end sills, a side plate and side plate reinforcing structure extending between the end walls, a plurality of movable door members forming the entire closure between the side plates and side sills and extending between the end walls of the car, means supporting said door members on their respective supporting structures and accommodating movement of said doors between open and closed positions, a roof supporting structure comprising spaced columns extending from adjacent the roof through the car floor and center sill and means securing said columns to the top of the center sill, and means securing said columns to the bottom of said center sill, beams extending radially from the upper end of said columns to said side plate structure to support the same intermediate their ends and a roof supported upon the side plate structure, said beams and said end walls.

2. A freight car comprising in combination an underframe including a center sill, end sill, side sills and floor, end walls, side plates extending between the upper outer corners of said end walls, a roof supporting structure comprising spaced columns extending from adjacent the roof through the floor and center sill to the bottom of said sill, means securing said columns to the bottom of said center sill, means securing said columns to the top of said center sills, means extending from the tops of said columns to said side plates to support the same intermediate of their ends, a roof secured to said roof supporting structure, said end walls and said side plates, a plurality of movable door members forming the only closure between the side plates and side sills and end walls of the car, and supporting structure for said door members accommodating movement of said doors between open and closed position.

3. The combination with a freight car having a roof, end walls, side plates extending between the upper outer corners of said end walls, side sills and center sill, of a roof and side plate supporting structure comprising spaced columns, the lower ends of which extend through and are fixed to the lower margin of said center sill, means securing said columns to the upper margin of said center sill, said columns extending upwardly through the center sill to adjacent the ridge of the roof, beams extending radially from said columns to said side plates to support the same intermediate their ends, the upper edge of said beams being coincident with the plane of said roof, said roof being secured to said beams, end walls and side plates, a plurality of slidable door members forming the only closure for the sides of the car between the end walls and the side plates and side sills, and supporting structure along the side sills for said door members accommodating movement of said door members between open and closed position.

4. The combination with a freight car having a center sill, side sills, end walls, side plates extending between upper outer corners of opposite end walls, and a roof, of a roof and side plate supporting structure comprising upright columns extending upwardly from the bottom of the center sill to adjacent the ridge of the roof, means securing the lower margin of said columns to the bottom and to the top of said center sill, beams extending radially from the upper margin of said columns to said side plates to support the same intermediate their ends, means securing said roof to said beams, side plates and end walls, a plurality of longitudinally slidable door members forming the entire closure for the sides of the car between the end walls and side plates and side sills, and supporting structure along said side sills for said door members accommodating movement of said door members from opened to closed positions.

5. The structure set forth in claim 3, said supporting structure comprising tracks along said side sills, some doors being slidable along one track and other doors being slidable along other tracks in opening and closing the side area of the car.

6. The structure set forth in claim 3, said supporting structure comprising a plurality of tracks, the doors being divided into groups, each group being slidable along a certain track in opening and closing the side area of the car.

References Cited by the Examiner

UNITED STATES PATENTS

| | | | |
|---|---|---|---|
| 1,208,097 | 12/1916 | Collins et al. | 50—459 |
| 1,400,140 | 12/1921 | Callery | 105—378 |
| 2,033,689 | 3/1936 | Dawson | 50—49 |
| 2,128,539 | 8/1938 | Roach | 50—49 |
| 2,756,694 | 7/1956 | Wardein | 105—378 |
| 2,930,332 | 3/1960 | Cook et al. | 105—378 |
| 2,996,020 | 8/1961 | Udstad | 105—367 |

ARTHUR L. LA POINT, *Primary Examiner.*

LEO QUACKENBUSH, MILTON BUCHLER,
*Examiners.*